United States Patent
Jonschker et al.

(10) Patent No.: US 6,187,426 B1
(45) Date of Patent: Feb. 13, 2001

(54) COMPOSITE MATERIALS

(75) Inventors: Gerhard Jonschker, Spiesen-Elversberg; Martin Mennig, Quierschied; Helmut Schmidt, Saarbruecken-Guedingen; Rainer Angenendt, Xanten, all of (DE)

(73) Assignees: Institut für Neue Materialien gem. GmbH, Saarbrücken; Pfleiderer Dämmstofftechnik International GmbH & Co., Neumarkt, both of (DE)

( * ) Notice: Under 35 U.S.C. 154(b), the term of this patent shall be extended for 0 days.

(21) Appl. No.: 09/297,574

(22) PCT Filed: Nov. 14, 1997

(86) PCT No.: PCT/EP97/06371

§ 371 Date: May 3, 1999

§ 102(e) Date: May 3, 1999

(87) PCT Pub. No.: WO98/21266

PCT Pub. Date: May 22, 1998

(30) Foreign Application Priority Data

Nov. 15, 1996 (DE) ................................. 196 47 369

(51) Int. Cl.$^7$ ....................................... D04H 1/00
(52) U.S. Cl. ........................................ 428/292.1; 523/216
(58) Field of Search ........................... 428/292.1; 523/216

(56) References Cited

U.S. PATENT DOCUMENTS 5,391,210 * 2/1995 Bilkadi et al. ........................... 51/298
5,648,407 * 7/1997 Goetz et al. ........................... 523/213

* cited by examiner

*Primary Examiner*—Edward J. Cain
(74) *Attorney, Agent, or Firm*—Heller Ehrman White & McAuliffe LLP

(57) ABSTRACT

A composite material is described which is characterized by a substrate based on glass fibers, mineral fibers or derived timber products and by a nanocomposite which is in functional contact with said substrate and is obtainable by surface modification of a) colloidal inorganic particles with
b) one or more silanes of the general formula (I)

$$R_x\text{—Si—}A_{4-x} \quad (I)$$

where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes;

under the conditions of the sol-gel process with a below-stoichiometric amount of water, based on the hydrolysable groups which are present, with formation of a nanocomposite sol, and further hydrolysis and condensation of the nanocomposite sol, if desired, before it is brought into contact with the substrate, followed by curing.

20 Claims, No Drawings

COMPOSITE MATERIALS

The invention relates to composite materials characterized by a substrate based on glass fibers, mineral fibers or derived timber products and by a nanocomposite which is in functional contact with said substrate and is obtainable by surface modification of a) colloidal inorganic particles with
b) one or more silanes of the general formula (I)

$$R_x\text{—Si—}A_{4-x} \quad (I)$$

where the radicals A are identical or different and are hydroxyl groups or groups which can be removed hydrolytically, except methoxy, the radicals R are identical or different and are groups which cannot be removed hydrolytically and x is 0, 1, 2 or 3, where $x \geq 1$ in at least 50 mol % of the silanes;

under the conditions of the sol-gel process with a substoichiometric amount of water, based on the hydrolysable groups which are present, with formation of a nanocomposite sol, and further hydrolysis and condensation of the nanocomposite sol, if desired, before it is brought into contact with the substrate, followed by curing.

The substrate may be of very different physical forms, and the nanocomposite may also be present in different forms of distribution. For example, the nanocomposite may cover the substrate partially or entirely in the form of a continuous covering or coating or it may be present between a plurality of substrates in lamellar form. Specific examples of composite materials of this type are fibers, twines, yarns, and semifinished products such as wovens, knits, braids and non-wovens provided with a thermally stable impregnation.

Alternatively the nanocomposite may form discontinuous or even point-shaped sites of contact between a plurality of substrates and may, for example, bind a particulate, flocculant or fibrous substrate in a matrix-like manner. Specific examples of composite materials of the latter type are insulating materials based on glass or mineral fibers and materials made of wood such as wood fiber slabs, particle boards, wood core plywood, plywood and wood-wool building slabs. For special purposes mixtures of glass fibers and timber materials may also be employed, e.g., for chip boards having flame-retardant properties.

Examples of suitable substrates are glass fibers, natural or man-made mineral fibers such as asbestos, mineral wool, slag wool, and fibers of ceramic materials including those of oxide ceramic; materials derived from timber in the form of cellulose, wood wool, wood flour, wood chips, paper, cardboard, wooden plates, wood borders and wood laminates.

The term fibrous substrates is taken to mean either individual fibers, including hollow fibers and whiskers, or corresponding fiber bundles, threads, ropes, twines and yarns, or semifinished products such as wovens, knits, braids, textiles, non-wovens, felts, webs, sheets and mats. Concrete examples of these are glass wool, glass fiber mats and mineral wool, e.g., slag wool, cinder wool, rock wool or basalt fibers.

The nanocomposite employed according to the invention is prepared by surface modification of colloidal inorganic particles (a) with one or more silanes (b), if desired in the presence of other additives (c) under the conditions of the sol-gel process.

Details of the sol-gel process are described in C. J. Brinker, G. W. Scherer: "Sol-Gel Science—The Physics and Chemistry of Sol-Gel-Processing", Academic Press, Boston, San Diego, New York, Sydney (1990) and in DE 1941191, DE 3719339, DE 4020316 and DE 4217432.

Here, specific examples of the silanes (b) which can be employed according to the invention and of their radicals A which are hydrolytically removable and their radicals R which are not hydrolytically removable are given.

Preferred examples of groups A which are removable hydrolytically are hydrogen, halogen (F, Cl, Br and I, in particular Cl and Br), alkoxy (in particular $C_{2-4}$-alkoxy, such as ethoxy, n-propoxy, isopropoxy and butoxy), aryloxy (in particular $C_{6-10}$-aryloxy, such as phenoxy), alkaryloxy (e.g. benzyloxy), acyloxy (in particular $C_{1-4}$-acyloxy, such as acetoxy and propionyloxy) and alkylcarbonyl (e.g. acetyl). Radicals A which are likewise suitable are amino groups (e.g. mono- or dialkyl-, -aryl- and -aralkylamino groups having the abovementioned alkyl, aryl and aralkyl radicals), amide groups (e.g. benzamido) and aldoxime or ketoxime groups. Two or three radicals A may also together form a moiety which complexes the Si atom, as for example in Si-polyol complexes derived from glycol, glycerol or pyrocatechol. Particularly preferred radicals A are $C_{2-4}$-alkoxy groups, in particular ethoxy. Methoxy groups are less suitable for the purposes of the invention, since they have an excessively high reactivity (short processing time of the nanocomposite sol) and can give nanocomposites and/or composite materials with insufficient flexibility.

The abovementioned hydrolysable groups A may, if desired, carry one or more usual substituents, for example halogen atoms or alkoxy groups.

The radicals R which are not hydrolytically removable are preferably selected from alkyl (in particular $C_{1-4}$-alkyl, such as methyl, ethyl, propyl and butyl), alkenyl (in particular $C_{2-4}$-alkenyl, such as vinyl, 1-propenyl, 2-propenyl and butenyl), alkynyl (in particular $C_{2-4}$-alkynyl, such as acetylenyl and propargyl), aryl (in particular $C_{6-10}$-aryl, such as phenyl and naphthyl) and the corresponding alkaryl and arylalkyl groups. These groups may also, if desired, have one or more usual substituents, for example halogen, alkoxy, hydroxy, amino or epoxide groups.

The abovementioned alkyl, alkenyl and alkynyl groups include the corresponding cyclic radicals, such as cyclopropyl, cyclopentyl and cyclohexyl.

Particularly preferred radicals R are substituted or unsubstituted $C_{1-4}$-alkyl groups, in particular methyl and ethyl, and substituted or unsubstituted $C_{6-10}$-aryl groups, in particular phenyl.

It is also preferable that x in the above formula (I) is 0, 1 or 2, particularly preferably 0 or 1. It is also preferable if x=1 in at least 60 mol %, in particular at least 70 mol %, of the silanes of the formula (I). In particular cases, it may be even more favourable if x=1 in more than 80 mol %, or even more than 90 mol % (e.g. 100 mol %), of the silanes of the formula (I).

The composite materials according to the invention may be prepared, for example, from pure methyltriethoxysilane (MTEOS) or from mixtures of MTEOS and tetraethoxysilane (TEOS), as component (b).

Concrete examples of silanes of the general formula (I) are compounds of the following formulae:

$Si(OC_2H_5)_4$, $Si(O$-n-or iso-$C_3H_7)_4$, $Si(OC_4H_9)_4$, $SiCl_4$, $Si(OOCCH_3)_4$, $CH_3$—$SiCl_3$, $CH_3$—$Si(OC_2H_5)_3$, $C_2H_5$—$SiCl_3$, $C_2H_5$—$Si(OC_2H_5)_3$, $C_3H_7$—$Si(OC_2H_5)_3$, $C_6H_5$—$Si$—$(OC_2H_5)_3$, $C_6H_5$—$Si(OC_2H_5)_3$, $(C_2H_5O)_3$—$Si$—$C_3H_6$—$Cl$, $(CH_3)_2SiCl_2$, $(CH_3)_2Si(OC_2H_5)_2$, $(CH_3)_2Si(OH)_2$, $(C_6H_5)_2SiCl_2$,
$(C_6H_5)_2Si(OC_2H_5)_2$, $(C_6H_5)_2Si(OC_2H_5)_2$,
$(iso\text{-}C_3H_7)_3SiOH$, $CH_2{=}CH{-}Si(OOCCH_3)_3$,
$CH_2{=}CH{-}SiCl_3$,
$CH_2{=}CH{-}Si(OC_2H_5)_3$, $HSiCl_3$,
$CH_2{=}CH{-}Si(OC_2H_4OCH_3)_3$, $CH_2{=}CH{-}CH_2{-}Si(OC_2H_5)_3$,
$CH_2{=}CH{-}CH_2{-}Si(OOCCH_3)_3$, $CH_2{=}C(CH_3)COO{-}C_3H_7{-}Si{-}(OC_2H_5)_3$,
$CH_2{=}C(CH_3){-}COO{-}C_3H_7{-}Si(OC_2H_5)_3$,
$n{-}C_6H_{13}{-}CH_2{-}CH_2{-}Si(OC_2H_5)_3$,
$n{-}C_8H_{17}{-}CH_2{-}CH_2{-}Si(OC_2H_5)_3$,

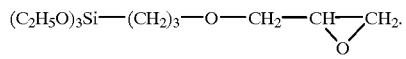

These silanes can be prepared by known methods; cf. W. Noll, "Chemie und Technologie der Silicone" [Chemistry and Technology of the Silicones], Verlag Chemie GmbH, Weinheim/Bergstraße, Germany (1968).

Based on the abovementioned components (a), (b) and (c), the proportion of component (b) is usually from 20 to 95% by weight, preferably from 40 to 90% by weight, and particularly preferably from 70 to 90% by weight, expressed as polysiloxane of the formula: $R_xSiO_{(2-0.5x)}$ which is formed in the condensation.

The silanes of the general formula (I) used according to the invention may be employed wholly or partially in the form of precondensates, i.e. compounds produced by partial hydrolysis of the silanes of the formula (I), either alone or in a mixture with other hydrolysable compounds. Such oligomers, preferably soluble in the reaction medium, may be straight-chain or cyclic low-molecular-weight partial condensates (polyorganosiloxanes) having a degree of condensation of e.g. from about 2 to 100, in particular from about 2 to 6.

The amount of water employed for hydrolysis and condensation of the silanes of the formula (I) is preferably from 0.1 to 0.9 mol, and particularly preferably from 0.25 to 0.75 mol, of water per mole of the hydrolysable groups which are present. Particularly good results are often achieved with from 0.35 to 0.45 mol of water per mole of the hydrolysable groups which are present.

Specific examples of colloidal inorganic particles (a) are sols and powders dispersible at the nano level (particle size preferably up to 300 nm, in particular up to 100 nm and particularly preferably up to 50 nm) of $SiO_2$, $TiO_2$, $ZrO_2$, $Al_2O_3$, $Y_2O_3$, $CeO_2$, $SnO_2$, $ZnO$, iron oxides or carbon (carbon black and graphite), in particular of $SiO_2$.

The proportion of component (a), based on the components (a), (b) and (c), is usually from 5 to 60% by weight, preferably from 10 to 40% by weight, and particularly preferably from 10 to 20% by weight.

For preparing the nanocomposite, other additives in amounts of up to 20% by weight, preferably up to 10% by weight, and in particular up to 5% by weight, may be employed as optional components (c); examples are curing catalysts, such as metal salts and metal alkoxides (e.g. aluminium alkoxides, titanium alkoxides or zirconium alkoxides), organic binders, such as polyvinyl alcohol, polyvinyl acetate, starch, polyethylene glycol and gum arabic, pigments, dyes, flame retardants, compounds of glass-forming elements (e.g. boric acid, boric acid esters, sodium methoxide, potassium acetate, aluminium sec-butoxide, etc.), anti-corrosion agents and coating aids. According to the invention, the use of binders is less preferred.

The hydrolysis and condensation is carried out under sol-gel conditions in the presence of acid condensation catalysts (e.g. hydrochloric acid) at a pH of preferably from 1 to 2, until a viscous sol is produced.

It is preferable if no additional solvent is used besides the solvent produced in the hydrolysis of the alkoxy groups. If desired, however, alcoholic solvents, such as ethanol, or other polar, protic or aprotic solvents, such as tetrahydrofuran, dioxane, dimethylformamide or butyl glycol, for example, may be employed.

In order to achieve a favourable sol particle morphology and sol viscosity, the resultant nanocomposite sol is preferably subjected to a special post-reaction step in which the reaction mixture is heated to temperatures of from 40 to 120° C. over a period of from a number of hours to a number of days. Special preference is given to storage for one day at room temperature or heating for a number of hours at from 60 to 80° C. This gives a nanocomposite sol with a viscosity of preferably from 5 to 500 mPas, particularly preferably from 10 to 50 mPas. The viscosity of the sol can also, of course, be adjusted to suitable values for the specific application by adding solvents or removing side-products of the reaction (e.g. alcohols). The post-reaction step may preferably also be coupled with a reduction of the solvent content.

The proportion by weight of the nanocomposite in the composite material is preferably from 0.1 to 80% by weight, in particular from 1 to 40% by weight, and particularly preferably from 1 to 20% by weight.

The substrate and the nanocomposite or nanocomposite sol are combined after at least initial hydrolysis of component (b) and in any case before final curing. Before it is brought into contact with the substrate, the nanocomposite sol is preferably activated by feeding in a further amount of water.

The contact can be brought about by any means known to the person skilled in the art and deemed to be useful for the particular case, e.g. by simple mixing of substrate and nanocomposite sol, dipping, spraying or showering, knife- or spin-coating, pouring, spreading, brushing, etc., into the or with the nanocomposite sol. In order to improve the adhesion between substrate and nanocomposite, it may be advantageous in many cases to subject the substrate, before contact with the nanocomposite or its precursor, to a conventional surface pretreatment, e.g. corona discharge, degreasing, treatment with primers, such as aminosilanes, epoxy silanes, sizes made from starch or silicones, complexing agents, surfactants etc.

Before final curing, a drying step at room temperature or slightly elevated temperature (e.g. up to about 50° C.) may be undertaken.

The actual curing or a precuring can be carried out at room temperature, but preferably by heat treatment at temperatures above 50° C., preferably above 100° C. and particularly preferably at 150° C. or above. The maximum curing temperature depends, inter alia, on the melting point and/or the heat resistance of the substrate, but is generally from 250 to 300° C. With mineral substrates, however, significantly higher curing temperatures are also possible, e.g. from 400 to 500° C. and above. Curing times are generally in the range from minutes to hours, e.g. from 2 to 30 minutes.

Besides conventional curing by heat (e.g. in a circulating air oven) other curing methods may be used, for example curing with IR beams or laser beams. If desired, the composite prepared may also be subjected to a shaping process before curing.

The invention also relates to the use of the abovementioned nanocomposite for the coating and/or consolidation of the abovementioned substrates. The term "consolidation" is intended here to include any measure which is suitable for providing the substrate in consolidated and/or compacted form, and thus includes, for example, impregnation of the substrate with nanocomposite, embedding of the substrate into a matrix of nanocomposite or cementation or binding of substrates or pieces of substrate with nanocomposite. The term "coating" is taken to mean in particular a partial or complete encapsulation of a substrate with a nanocomposite in order to give this substrate, or pieces thereof, particular properties, for example oxidation resistance, flame retardancy, hydrophobic or oleophobic character, hardness, impermeability, or electrical or thermal insulation.

The following examples further illustrate the present invention. In the following examples, the silica sol employed is an aqueous silica sol from BAYER ("Levasil 300/30") with a solids content of 30% by weight and a particle size of from 7 to 10 nm. The following abbreviations are furthermore used in the examples:

MTEOS=Methyltriethoxysilane
TEOS=Tetraethoxysilane
PTEOS=Phenyltriethoxysilane

EXAMPLE 1

A mixture of 65 mole % of MTEOS, 15 mole % of PTEOS and 20 mole % of TEOS (or, alternatively, of 80 mole % of MTEOS and 20 mole % of TEOS) is vigorously stirred with silica sol and hydrochloric acid as catalyst in order to prepare a nanocomoposite sol by hydrolysis and condensation of the silanes. The amount of water introduced by means of the silica sol is such that 0.8 moles of water are present per mole of hydrolysable group. About 5 minutes after the preparation of the sol the above silane mixture is added thereto so that the total water content of the resulting mixture is 0.4 moles of water per mole of alkoxy groups. The silica sol accounts for about 14 wt. % of the total solids content.

Following a post-reaction phase of about 12 hours at room temperature, water is added to the above mixture in an amount which results in a total water content of the sol of 0.5 moles of water per mole of alkoxy groups. After about 5 minutes the mixture is ready for use.

The ready-for-use mixture is sprayed onto dampened glass wool through an atomizing ring and cured for about 5 to 10 minutes in a circulating air oven at about 200° C. Thereby an elastic insulating material showing highly improved flame properties in comparison to glass wool bonded with phenolic resin is obtained.

EXAMPLE 2

68.7 ml of MTEOS (corresponding to 80 mole %) and 19.2 ml of TEOS (corresponding to 20 mole %) are mixed and half of said mixture is vigorously stirred with 11.7 ml of silica sol (corresponding to a proportion of 14.3% by weight of silica sol) and 0.386 ml of concentrated hydrochloric acid. Five minutes later the second half of the silane mixture is added to the run, whereafter stirring is continued for a further 5 minutes. Subsequently the resulting sol is subjected to a post-reaction step (allowing it to stand at room temperature for 2 hours). Thereby a storage-stable precondensate having a $SiO_2$ solids content of about 300 g/l and 0.4 moles of water per mole of hydrolysable group is obtained. By concentration on a rotary evaporator the solids content is adjusted to 60 wt. %.

Prior to the application of the binder, 3.0 ml of titanium isopropylate and about 2.5 ml of water are added thereto in order to reach a water content of 0.5 moles of water per mole of hydrolysable group. The mixture thus prepared is mixed with wood chips in an amount which results in 15% of the composition consisting of $SiO_2$. Subsequently the composition is bonded in a hot press at 180° C. for 10 minutes to form a shaped body. Thereby a shaped body resembling a common glaced insulating press board is obtained, which body is, however, prepared without organic binder. The flame properties of a corresponding plate are significantly improved in comparison to those of a conventional glaced insulating press board.

EXAMPLE 3

1. Preparation of the sol 172 ml of MTEOS are mixed with 48 ml of TEOS. 29 ml of silica sol and 2 ml of sulfuric acid (35%) are added thereto with vigorous stirring. Five minutes thereafter an opaque sol has formed which is allowed to post-react for 4 hours at room temperature. Following the addition of a further 3 ml of water with stirring the mixture is ready for use after about 5 minutes.

2. Application of the sol 2.1

100 g of wood chips are mixed with 60 ml of sol and molded under a pressure of 7.1 mPa in a press mold having a diameter of 12 cm for 10 minutes. Subsequently the molding is pressed in a heatable press (upper and lower mold heated) at a pressure of 2.6 mPa and a temperature of 100° C. for about 3 hours. Thereby a mechanically stable shaped body having a wood chips content of 82 wt. % is obtained.

2.2

300 g of rock wool granules are mixed with 10 ml of the above sol and are pressed at a pressure of 4.4 mPa in a press mold having a diameter of 12 cm for 5 minutes. Subsequently the molding is exposed to a temperature of 80° C. for 8 hours in a circulating air dryer. Thereby a mechanically stable shaped body having a content of rock wool granules of 1 wt. % is obtained.

We claim:

1. A method of manufacturing a composite material comprising a substrate selected from the group consisting of glass fibers, mineral fibers, and timber derived products, and a nanocomposite in functional contact with the substrate, the method comprising:

(1) surface modifying colloidal inorganic particles with one or more silanes of the general formula

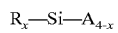

where
each A is the same or different and is selected from hydroxyl and groups that are hydrolytically removable but are not methoxy,
each R is the same or different and is selected from groups that are not hydrolytically removable, and
x is 0, 1, 2, or 3,
where x≧1 in at least 50 mol % of the silanes; under sol-gel process conditions with a quantity of water that is sub-stoichiometric based on the quantity of hydrolytically removable groups present on the silanes, thereby preparing a nanocomposite sol;

(2) optionally further hydrolyzing and condensing the nanocomposite sol;

(3) optionally activating the nanocomposite sol with a further quantity of water;

(4) contacting the substrate with the nanocomposite sol; and (5) curing the contacted substrate, thereby forming the composite material.

2. The method of claim 1 where the step of preparing the nanocomposite sol is carried out in the presence of an acid condensation catalyst at a pH of from 1 to 2.

3. The method of claim 1 where the step of further hydrolyzing and condensing the nanocomposite sol takes place at a temperature between room temperature and 120° C.

4. The method of claim 1 where the colloidal inorganic particles are selected from the group consisting of sols and dispersible nanoscale powders of $TiO_2$, $ZrO_2$, $Al_2O_3$, $Y_2O_3$, $CeO_2$, $SnO_2$, $ZnO$, iron oxides, and carbon.

5. The method of claim 1 where the colloidal inorganic particles comprise from 5% to 60% by weight of the nanocomposite.

6. The method of claim 1 where the silanes, when expressed as polysiloxane of the formula $R_xSiO_{(2-0.5x)}$, comprise from 20% to 95% by weight of the composite.

7. The method of claim 1 where additives are added during preparation of the nanocomposite sol.

8. The method of claim 7 where the additives are selected from the group consisting of curing catalysts, organic binders, pigments, dyes, flame retardants, compounds of glass-forming elements, anti-corrosion agents, and coating aids.

9. The method of claim 7 where the additives comprise not more than 20% by weight of the nanocomposite.

10. The method of claim 1 where each A is selected from $C_{2-4}$ alkoxy.

11. The method of claim 1 where each R is selected from optionally substituted $C_{1-4}$ alkyl and optionally substituted $C_{6-10}$ aryl.

12. The method of claim 1 where the quantity of water used in the step of preparing the nanocomposite sol is from 0.1 to 0.9 mol of water per mol of hydrolytically removable groups in the silanes.

13. The method of claim 1 where the nanocomposite comprises from 0.1 to 80% by weight of the composite material.

14. The method of claim 1 where the step of curing the contacted substrate comprises thermal curing.

15. The method of claim 1 where the substrate is coated with the nanocomposite.

16. The method of claim 1 where the substrate is consolidated with the nanocomposite.

17. The method of claim 1 where the substrate is a fabric and is impregnated with the nanocomposite.

18. The method of claim 1 which further comprises forming a laminate by sandwiching the composite material between laminate layers.

19. A composite material manufactured by the method of claim 1.

20. A composite material manufactured by the method of claim 1.

* * * * *